(12) United States Patent
Liao et al.

(10) Patent No.: US 12,251,790 B2
(45) Date of Patent: Mar. 18, 2025

(54) POLISHING HEAD MANAGEMENT SYSTEM AND METHOD (71) Applicant: CHANGXIN MEMORY TECHNOLOGIES, INC., Hefei (CN)

(72) Inventors: Fan-Wei Liao, Hefei (CN); Chin-Chung Ku, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 851 days.

(21) Appl. No.: 17/435,330

(22) PCT Filed: Apr. 1, 2021

(86) PCT No.: PCT/CN2021/085095
§ 371 (c)(1),
(2) Date: Aug. 31, 2021

(87) PCT Pub. No.: WO2021/213174
PCT Pub. Date: Oct. 28, 2021

(65) Prior Publication Data
US 2022/0324077 A1    Oct. 13, 2022

(30) Foreign Application Priority Data
Apr. 20, 2020    (CN) .......................... 202010313793.8

(51) Int. Cl.
*B24B 7/22* (2006.01)
*B23Q 3/155* (2006.01)
*G05B 19/418* (2006.01)

(52) U.S. Cl.
CPC ............ *B24B 7/22* (2013.01); *B23Q 3/15513* (2013.01); *G05B 19/4183* (2013.01); *G05B 2219/45096* (2013.01)

(58) Field of Classification Search
CPC .. B24B 7/22; B23Q 3/15513; G05B 19/4183; G05B 2219/45096; G05B 19/4187;
(Continued)

(56) References Cited

U.S. PATENT DOCUMENTS 5,205,436 A  *  4/1993  Savage ..................... G07F 7/06
                                                       221/75
6,926,587 B2 *  8/2005  Takeuchi ................ B24B 57/02
                                                       451/36
(Continued)

FOREIGN PATENT DOCUMENTS

CN          104364051 A       2/2015
CN          105170483 A      12/2015
(Continued)

OTHER PUBLICATIONS

International Search Report for International Application PCT/CN2021/085095 mailed Jul. 2, 2021.

*Primary Examiner* — Patrick H Mackey
(74) *Attorney, Agent, or Firm* — Kilpatrick Townsend & Stockton LLP (57) ABSTRACT

The embodiments of the present disclosure provide a polishing head management system and method. The polishing head management system includes: a storage device, a pick-and-place device and a data acquisition device, where the storage device is used to store polishing heads; the pick-and-place device is used to pick a polishing head or place a polishing head into the storage device; the data acquisition device is connected with the storage device and the pick-and-place device, and is used to record at least one management cycle of the polishing head.

8 Claims, 5 Drawing Sheets

(58) Field of Classification Search
CPC .... G06F 17/00; G06K 17/00; G06K 17/0025; G06K 17/0029; G06Q 10/08; G06Q 10/087

See application file for complete search history.

(56) References Cited

U.S. PATENT DOCUMENTS

| | | | |
|---|---|---|---|
| 6,989,749 B2* | 1/2006 | Mohr | G08B 13/14 340/568.1 |
| 9,665,848 B1* | 5/2017 | Johnson | G08B 13/2417 |
| 9,740,897 B1* | 8/2017 | Salour | G06K 7/10079 |
| 9,811,962 B2* | 11/2017 | Phillips | G07C 9/22 |
| 10,081,089 B2 | 9/2018 | Kottbus et al. | |
| 2007/0243796 A1* | 10/2007 | Torii | B24B 37/32 451/41 |
| 2008/0111691 A1* | 5/2008 | Lee | G06K 17/00 340/572.1 |
| 2019/0088061 A1* | 3/2019 | Phillips | B25H 3/00 |

FOREIGN PATENT DOCUMENTS

| | | | |
|---|---|---|---|
| CN | 105344867 A1 | | 2/2016 |
| CN | 207457725 U | | 6/2018 |
| JP | 2018195103 A | * | 12/2018 |
| WO | 2020072405 | | 4/2020 |

* cited by examiner

POLISHING HEAD MANAGEMENT SYSTEM AND METHOD

CROSS REFERENCE TO RELATED APPLICATIONS

This patent application is a national stage entry of International Patent Application No. PCT/CN2021/085095, filed on Apr. 1, 2021, which claims the benefit of priority of Chinese Patent Application No. 202010313793.8, filed on Apr. 20, 2020. The disclosures of the aforementioned patent applications are incorporated by reference herein in their entirety as part of the present disclosure.

TECHNICAL FIELD

The embodiments of the present disclosure relate to the field of automatic storage, in particular to a polishing head management system and method.

BACKGROUND

Chemical mechanical polishing (CMP) is a method for forming planar surfaces on semiconductor wafers, field emission displays and other microelectronic substrates, which is widely used in the semiconductor industry. The four elements of the CMP process include polishing pad, polishing pad dresser, polishing head and polishing liquid. Among them, the polishing head is a non-disposable consumable. After the polishing head is taken off the machine, it is cleaned or replaced by accessories, and stored in the storage cabinet for next on-machine use. In the prior art, the polishing head is manually picked and placed, and the use time of the polishing head is manually recorded with paper.

There are at least the following problems in the prior art: the manual picking and placing of the polishing head and the manual recording of the use time of the polishing head require a large labor cost, and the paper record sheet is not easy to save.

SUMMARY

An objective of the embodiments of the present disclosure is to provide a polishing head management system and method. The present disclosure can automatically pick and place the polishing head and automatically record the use time of the polishing head, thereby reducing the labor cost.

In order to solve the above technical problem, the embodiments of the present disclosure provide a polishing head management system and method. The polishing head management system includes:

a storage device, a pick-and-place device and a data acquisition device, where the storage device is used to store polishing heads; the pick-and-place device is used to pick a polishing head or place a polishing head into the storage device; the data acquisition device is connected with the storage device and the pick-and-place device, and the data acquisition device is used to record at least one management cycle of the polishing head; the management cycle comprises a time interval between the time of the polishing head being picked from the storage device by the pick-and-place device and the time of the polishing head being placed back into the storage device or a time interval between the time of the polishing head being placed into the storage device by the pick-and-place device and the time of the polishing head being picked from the storage device.

An embodiment of the present disclosure further provides a polishing head management method. The management method includes: providing a storage device, where the storage device stores polishing heads; providing a pick-and-place device, and picking, by the pick-and-place device, a polishing head from the storage device, or placing a, by the pick-and-place device, polishing head into the storage device; and providing a data acquisition device, and recording, by the data acquisition device, a first time when the polishing head is picked from the storage device and recording, by the data acquisition device, a second time when the polishing head is placed back into the storage device.

Compared with the prior art, the embodiments of the present disclosure use a pick-and-place device to pick and place the polishing head, and use a data acquisition device to automatically record the movement of the polishing head in and out of the storage device and acquire at least one management cycle of the polishing head. The embodiments of the present disclosure can acquire the current use time of the polishing head according to the recorded time interval, and can acquire the total use time of the polishing head according to historical records (i.e. the first time in history and the second time in history). In this way, the embodiments of the present disclosure avoid manually recording the use time of the polishing head through a paper sheet, thereby further reducing the labor cost and realizing environmentally friendly paperless operations.

BRIEF DESCRIPTION OF THE DRAWINGS

One or more embodiments are exemplified descriptions by corresponding accompanying drawings, and these exemplified descriptions do not constitute a limitation on the embodiments. Components with the same reference numerals in the accompanying drawings are denoted as similar components, and the accompanying drawings are not limited by scale unless otherwise specified.

DETAILED DESCRIPTION

In order to make the objectives, technical solutions and advantages of the embodiments of the present disclosure clearer, the embodiments of the present disclosure are described below with reference to the accompanying drawings. Those of ordinary skill in the art should understand that many technical details are proposed in each embodiment of the present disclosure to help the reader better understand the present disclosure. However, even without these technical details and various changes and modifications made based on the following embodiments, the technical solutions claimed in the present disclosure can be realized.

Figure 1:
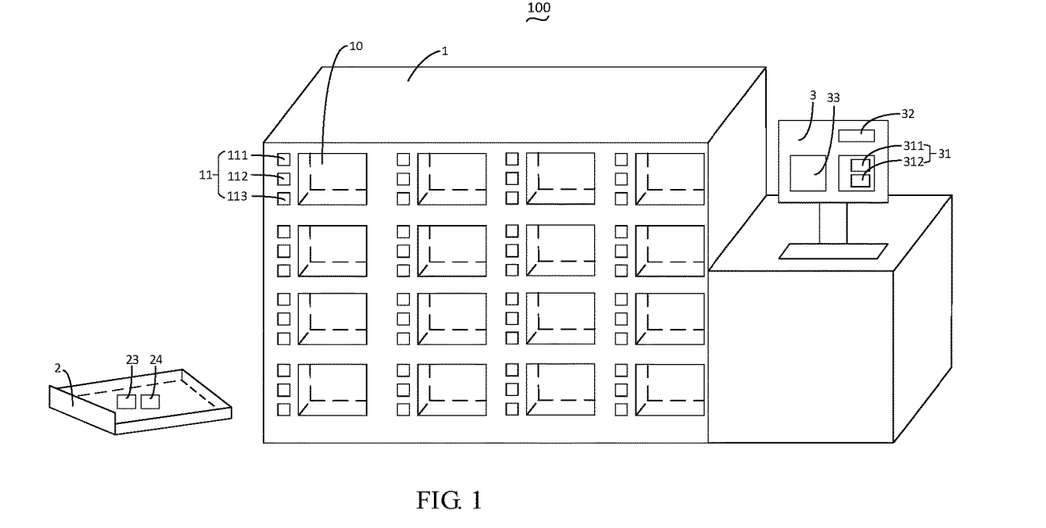
FIG. 1 is a schematic structural diagram of a polishing head management system according to an embodiment of the present disclosure.

An embodiment of the present disclosure relates to a polishing head management system 100. As shown in FIG. 1, which provides a specific structure of the management system, the management system includes: a storage device 1, a pick-and-place device 2 and a data acquisition device 3.

The storage device 1 is used to store polishing heads. The pick-and-place device 2 is used to pick a polishing head or place a polishing head into the storage device 1. The data acquisition device 3 is used to record at least one management cycle of the polishing head. The management cycle includes a time interval between the time of the polishing head being picked from the storage device 1 by the pick-and-place device 2 and the time of the polishing head being placed back into the storage device 1 or a time interval between the time of the polishing head being placed into the storage device 1 by the pick-and-place device 2 and the time of the polishing head being picked from the storage device 1.

Specifically, the storage device 1 in this embodiment may be a storage cabinet. The storage cabinet includes a plurality of mutually independent storage units, and each storage unit stores each polishing head. It is worth mentioning that since the polishing heads have various specifications, the storage units in this embodiment also have various specifications, so as to store polishing heads of different specifications. In addition, the storage units of different specifications may be provided in different positions of the storage cabinet. For example, storage units of a first specification are provided in a first row, and storage units of a second specification are provided in a second row . . . and so on. In this way, the polishing head of a required specification can be found more quickly in practical applications. It is understandable that this embodiment does not specifically limit the positions of the storage units of different specifications in the storage device 1, and different storage devices 1 may be provided according to actual needs.

In this embodiment, the pick-and-place device 2 may be a polishing mobile support. The polishing mobile support includes a holding space for holding the polishing head. When the polishing head needs to be used, the polishing mobile support moves to the storage device 1, and picks the polishing head from the storage device 1 by a manipulator, holds the polishing head in the holding space, and then moves to a position where the polishing head needs to be used (such as at a chemical mechanical polishing (CMP) machine). It is worth mentioning that the manipulator in this embodiment includes a manipulator arm and a clamping part movably connected with the manipulator arm. The polishing head is provided with a groove which can cooperate with the clamping part. When the pick-and-place device 2 picks the polishing head, the clamping part is accommodated in the groove of the polishing head. This effectively prevents the polishing head from falling off the manipulator during movement, and improves the stability of the polishing head management system 100.

It should be noted that the data acquisition device 3 in this embodiment may be a supervisory control and data acquisition (SCADA) system. The SCADA system is a computer-based production process control and dispatch automation system, which can supervise and control on-site operating equipment. In other words, the data acquisition device 3 can be used as a central controller to control the movement of the pick-and-place device 2.

It is worth mentioning that the storage device 1 and the data acquisition device 3 in this embodiment may be integrated, that is, the SCADA system is provided on the storage cabinet. They may also be separated from each other, that is, the data acquisition device 3 is an electronic device communicatively connected with the storage device 1, and the electronic device is provided with the SCADA system.

Compared with the prior art, the embodiments of the present disclosure use a pick-and-place device to pick and place the polishing head, and use a data acquisition device to automatically record the movement of the polishing head in and out of the storage device and acquire at least one management cycle of the polishing head. The embodiments of the present disclosure can acquire the current use time of the polishing head according to the recorded time interval, and can acquire the total use time of the polishing head according to historical records (i.e. the first time in history and the second time in history). In this way, the embodiments of the present disclosure avoid the occurrence of manually recording the use time of the polishing head through a paper sheet, thereby further reducing the labor cost and realizing environmentally friendly paperless operations.

In this embodiment, the data acquisition device 3 includes an identification module 31. The identification module 31 is used to identify pairing information between each of the storage units and each of the polishing heads. Specifically, the identification module 31 includes a first identification module 311 and a second identification module 312 that are communicatively connected. The first identification module 311 is used to identify pairing information between the storage unit and the pick-and-place device 2. The second identification module 312 is used to identify pairing information between the pick-and-place device 2 and the polishing head. There are a plurality of polishing heads stored in the storage device 1, so there are a plurality of pick-and-place devices 2. In this way, the present disclosure can accurately obtain the identity of the picked polishing head (that is, which polishing head is picked), so as to more accurately record the use time of each polishing head.

More specifically, the first identification module 311 in this embodiment may be a card reader, and a radio frequency identification tag (RFID) may be provided on the pick-and-place device 2. The pairing information between the storage unit and the pick-and-place device 2 can be obtained through the pairing of the RFID tag and the card reader. The second identification module 312 may be a two-dimensional (2D) barcode scanner, and a 2D barcode is provided on the polishing head. By scanning the 2D barcode, the pairing information between the pick-and-place device 2 and the polishing head can be obtained. It is worth mentioning that when the polishing head is operating on the machine, it will be in contact with the polishing liquid and water, which makes it hard to obtain the pairing information between the pick-and-place device 2 and the polishing head. The 2D barcode provided on the polishing head is effectively prevented from being corroded by the polishing liquid and water, thereby improving the reliability of the polishing head management system 100.

It is understandable that the current actual position of the polishing head can be acquired through the pairing of the pick-and-place device 2 and the polishing head, such that the movement trend of the polishing head can be accurately grasped for more convenient management.

In a feasible embodiment, when the CMP machine needs a polishing head, the CMP machine sends a request for a polishing head to the data acquisition device 3, where the request includes the specification of the required polishing head. After receiving the request, the data acquisition device 3 searches for the storage position of the polishing head in the storage device 1 according to the specification of the required polishing head, and sends a pick instruction to the pick-and-place device 2, where the pick instruction includes the storage position. After receiving the instruction, the pick-and-place device 2 moves to the storage position, picks the polishing head, and transports the polishing head to the CMP machine. Throughout the process, the data acquisition device 3 can acquire the position of the pick-and-place device 2 through the pairing of the RFID tag and the card reader, so as to grasp the movement trend of the polishing head.

It is worth mentioning that the pick-and-place device 2 further includes a gravity sensing module 23. The gravity sensing module 23 is used to sense the weight of the polishing head held by the pick-and-place device 2 and send the weight to the data acquisition device 3. The polishing head is corroded by the polishing liquid during operation, which causes the weight of the polishing head to change. By sending the weight of the polishing head to the data acquisition device 3, the data acquisition device 3 can analyze whether the polishing head of the weight can be used normally, and issue an alarm message when the polishing head is hard to use normally. The alarm message will remind the staff to repair or replace the polishing head in time, thereby improving the reliability of the polishing head management system 100.

Referring to FIG. 1, the storage device 1 includes a plurality of storage units 10. Each storage unit 10 is used to store a polishing head, and the storage units 10 have various specifications.

In one embodiment, the storage device 1 includes a plurality of display modules 11. The display modules 11 are communicatively connected with the data acquisition device 3 and are used to display the storage status of each storage unit 10.

In a feasible embodiment, each display module 11 is matched with a storage unit 10. The display module 11 emits a first color light when there is a polishing head stored in the corresponding storage unit 10, a second color light when no polishing head is stored, and a third color light when a polishing head is to be picked. Specifically, the display module 11 includes a first light-emitting unit 111, a second light-emitting unit 112 and a third light-emitting unit 113. The first light-emitting unit 111 emits the first color light (for example, green light), which indicates that there is a polishing head stored in the storage space. The second light-emitting unit 112 emits the second color light (for example, red light), which indicates that there is no polishing head in the storage space, and the storage space is available for a polishing head. The third light-emitting unit 113 emits the third color light (for example, yellow light), which indicates that a polishing head is stored in the storage space, and the polishing head is ready to be picked. In this way, the storage status of the storage device 1 is displayed more intuitively. It is understandable that this embodiment does not specifically limit the manner in which the display module 11 displays the storage status of each storage unit 10. In addition to displaying the different storage statuses of the storage units 10 by emitting lights of different colors, the storage statuses of each storage unit 10 may also be displayed in other forms, such as generating data reports, etc. Those skilled in the art may set different display modes for the display module 11 according to actual needs.

In an embodiment, the pick-and-place device 2 further includes a light sensing module 24. The light sensing module 24 is used to sense the third color light. The pick-and-place device 2 is further used to move to the light emitting module 11 emitting the third color light when the light sensing module 24 senses the third color light. For ease of understanding, a specific example is given below on how to pick the polishing head by the pick-and-place device 2.

When the CMP machine needs a polishing head, the CMP machine sends a request for a polishing head to the data acquisition device 3, where the request includes the specification of the required polishing head. After receiving the request, the data acquisition device 3 searches for the storage position of the polishing head in the storage device 1 according to the specification of the required polishing head. Then the data acquisition device 3 controls the third light-emitting unit 113 at the storage position to emit a light, and sends a pick instruction to the pick-and-place device 2. After receiving the instruction, the pick-and-place device 2 moves to the storage device 1 and moves to the position where the third color light is emitted (that is, the storage position) with the help of the light sensing module 24. Then the pick-and-place device 2 picks the polishing head and transports the polishing head to the CMP machine.

In another feasible embodiment, the data acquisition device 3 includes an alarm module 32. The alarm module 32 is used to send out a first alarm message when an error between a time interval and a preset time interval exceeds a preset range. Wherein, the time interval is a difference between the second time and the first time. Specifically, the operation time of the polishing head during each operation is stable (for example, 30-40 min). If the operation time of the polishing head is lower or higher (such as 2 min or 80 min), it indicates that the polishing head is abnormal or the CMP machine using the polishing head is abnormal. In this case, an alarm message is sent to remind the staff to detect whether the polishing head or the CMP machine is in an abnormal status in a timely manner, thereby further improving the reliability of the polishing head management system. It should be noted that this embodiment does not specifically limit the preset time interval and the preset range, and different preset time intervals and preset ranges may be set according to actual applications.

In another feasible embodiment, the data acquisition device 3 includes an alarm module 32. The data acquisition device 3 is further used to record the polishing head corresponding to the time interval as abnormal use when an error of the time interval and the preset time interval exceeds the preset range. Wherein, the time interval is a difference between the second time and the first time. The alarm module 32 is used to send a first alarm message when a number of abnormal uses of the polishing head recorded by the data acquisition device 3 exceeds a first preset number. Specifically, the operation time of the polishing head during each operation is stable (for example, 30-40 min). If the operation time of the polishing head is lower or higher (such as 2 min or 80 min), it indicates that the polishing head may be abnormal. In this case, the polishing head is recorded with one abnormal use. After the recorded number of abnormal uses reaches the first preset number of abnormal uses (such as 3 or 4, etc.), the alarm module 32 sends a first alarm message. This can improve the accuracy for determining the abnormal use of the polishing head, and further improve the stability of the polishing head management system 100. It should be noted that this embodiment does not specifically limit the first preset number, and it may be set according to actual needs.

In another feasible embodiment, the data acquisition device 3 is further used to record the polishing head corresponding to the time interval as normal use when the error of the time interval and the preset time interval does not exceed the preset range. The alarm module 32 is further used to send a second alarm message when the number of normal uses of the polishing head recorded by the data acquisition device 3 exceeds a second preset number. Specifically, the polishing head is a non-disposable consumable, so it needs to be cleaned or replaced in time for the next use. By sending the second alarm message upon a certain number (such as 4 or 5, etc.) of normal uses of the polishing head, it is convenient to clean or replace the polishing head in time.

Further, the data acquisition device 3 may also record a cleaning frequency of each polishing head, such that the polishing head can be replaced in time when the cleaning frequency reaches a threshold.

Further, the data acquisition device 3 may also record a cleaning time of each polishing head during each cleaning.

In another feasible embodiment, the data acquisition device 3 is further used to record a use number of each polishing head, and record a total use time of each polishing head according to the first time, the second time and the use number. The alarm module is further used to send a third alarm message when the total use time of the polishing head exceeds a preset time. Specifically, the polishing head is a non-disposable consumable, and it needs to be replaced in time after a certain use time (such as 10 h) so as to ensure the performance of the polishing head. Therefore, the method of the present disclosure can remind the staff to replace the polishing head in time, thereby further improving the reliability of the polishing head management system 100.

It is worth mentioning that the data acquisition device 3 further includes a control module 33. The control module 33 is communicatively connected with the identification module 31 and the pick-and-place device 2. The control module 33 presets a cycle time limit threshold. The control module 33 determines the storage status of the storage unit 10 according to the pairing information, the cycle time limit threshold and the management cycle, and assigns a corresponding storage unit 10 to the pick-and-place device 2 according to the storage status. This method makes the picking and placing of the polishing head more orderly, thereby further improving the reliability of the polishing head management system.

In a feasible embodiment, the data acquisition device 3 records a first time when the polishing head is picked from the storage device 1, and the data acquisition device 3 records a second time when the polishing head is placed back into the storage device 1. Further, the data acquisition device 3 takes statistics on the pairing information between each of the storage units 10 and each of the polishing heads in real time, and marks the storage status of storage units 10 without pairing information as empty. Then the data acquisition device 3 calculates an interval between a current time and the first time or the second time of each of the storage units 10 marked as empty in real time, and sorts the storage units based on the intervals from small to large in ascending order. Finally, the data acquisition device 3 sequentially assigns a corresponding storage unit 10 to the pick-and-place device according to the sort order.

For ease of understanding, the interval between the current time and the first time of each storage unit is taken as an example below to describe in detail how to assign a corresponding storage unit to the pick-and-place device in this embodiment.

It is assumed that there are five storage units A to E whose storage status is marked as empty. The times (i.e. the first times) when the polishing heads in the five storage units 10 are picked, which are 12:00, 13:00, 14:00, 15:00 and 16:00, respectively. The current time is 17:00, so the intervals between the current time and the first times of the storage units A to E are respectively 5 h, 4 h, 3 h, 2 h and 1 h. The storage unit A with the largest interval is assigned to the pick-and-place device. The pick-and-place device places a polishing head just off the machine into the storage unit A.

It should be noted that the operations of the polishing head are divided into on-machine operation and maintenance, each of which is subjected to a preset operation time. In other words, the cycle time limit threshold stored in the control module 33 includes a storage cycle time limit and an operation cycle time limit. The storage cycle time limit is a time interval threshold for the polishing head to be picked after being placed into the storage unit 10. The operation cycle time limit is a time interval threshold for the polishing head to be placed back into the storage unit 10 after being picked from the storage unit 10 for operation.

In another feasible embodiment, the movement trend of the polishing head is as follows: the polishing head is picked from the storage unit 10 to perform an on-machine operation; then the polishing head is taken off the machine and placed back into the storage unit; finally, the polishing head is maintained. Specifically, the polishing head will be taken off the machine after a period of time (that is, one operation cycle time limit, generally one month) of on-machine operation. The polishing head taken off the machine is directly sent to the storage unit. According to the labor arrangement, the unmaintained polishing head taken off the machine will be taken out for maintenance, and then sent back to the storage unit. The first time is recorded when the polishing head is picked, and the second time is recorded when the polishing head is placed back. The difference between the first time and the second time is the current operation time of the polishing head. The current operation time is compared with the operation cycle time limit, and if the current operation time is less than the operation cycle time limit, it is determined that the polishing head is abnormal. In this case, the pick-and-place device 2 is controlled to place the polishing head into the storage unit 10, and the polishing head is continuously tracked. This method makes it possible to find the problem of the polishing head in the first time, so as to maintain or repair the polishing head in time, thereby further improving the reliability of the polishing head management system 100.

Figure 2:
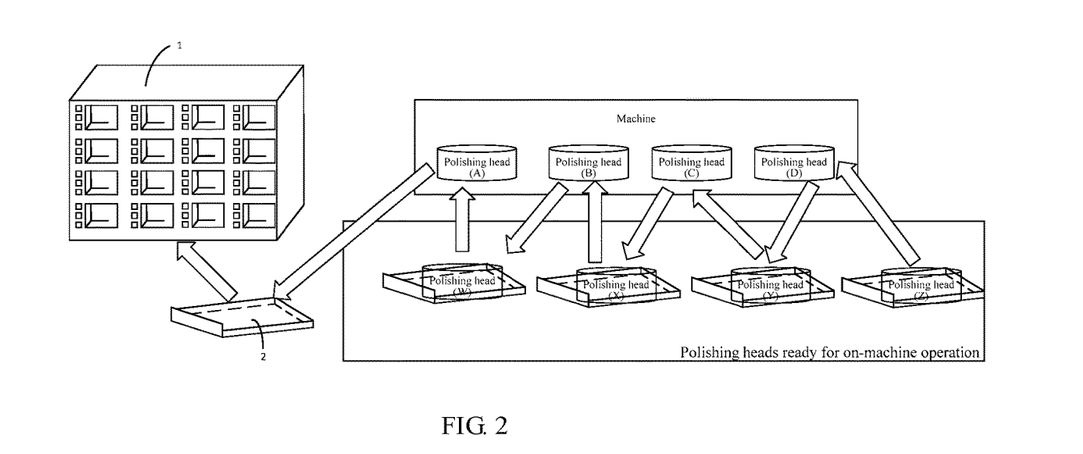
FIG. 2 is a schematic structural diagram showing work flow of polishing heads according to an embodiment of the present disclosure.

In another feasible embodiment, as shown in FIG. 2, the polishing head (A) first off the machine is placed in a pre-prepared pick-and-place device 2 (there is no other polishing head in the pick-and-place device 2). Through the 2D barcode pairing (that is, the storage device 1 scans the 2D barcode on the polishing head), the polishing head (A) is placed into an assigned storage position in the storage device 1. At this time, the polishing head (W) is ready for the on-machine operation. Then the polishing head (B) is ready to be taken off the machine. The polishing head (B) is placed in the pick-and-place device of the polishing head (W), and through the 2D barcode pairing, the polishing head (B) is placed in an assigned storage position in the storage device 1. At this time, the polishing head (X) is ready for the on-machine operation. In the same way, the operations of the polishing heads (A), (B), (C) and (D) are handed over to the polishing heads (W), (X), (Y) and (Z) in sequence. That is, the polishing heads (A), (B), (C) and (D) are taken off the machine for storage, while the polishing heads (W), (X), (Y) and (Z) replace the polishing heads (A), (B), (C) and (D) for the on-machine operations, and new pairing with the storage device 1 is completed.

It is worth mentioning that, in the on-machine operation of the polishing head, the 2D barcode scanner may also be provided on the machine to record on which machine the polishing head picked from the storage device 1 is operating. In this way, during the failure analysis of the polishing head, the abnormality of the polishing head can be matched with the condition of the machine, such that the abnormality analysis is more accurate, thereby further improving the reliability of the polishing head system 100.

Figure 3:
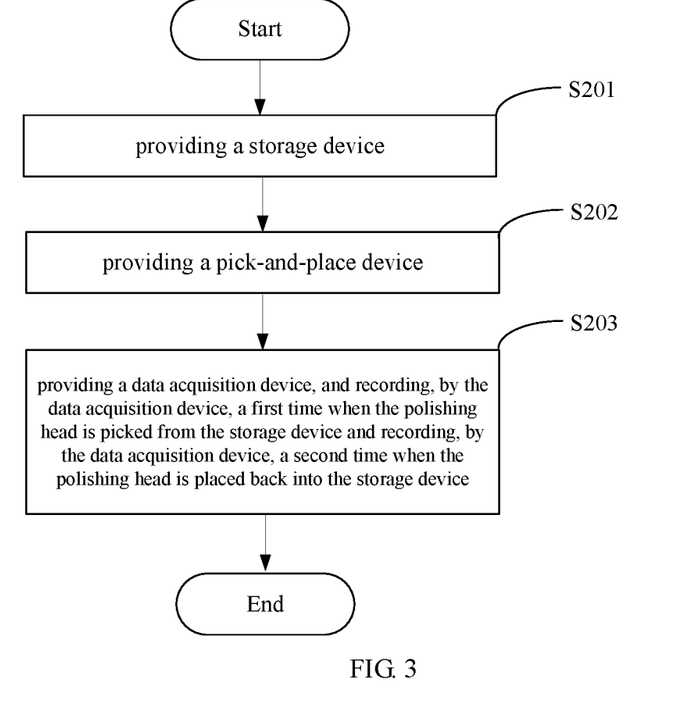
FIG. 3 is a flowchart of a polishing head management method according to an embodiment of the present disclosure.

Another embodiment of the present disclosure relates to a polishing head management method. As shown in FIG. 3, the management method of this embodiment includes:

S201: A storage device is provided.

Specifically, the storage device stores polishing heads to be used. The storage device may be a storage cabinet. The storage cabinet includes a plurality of mutually independent storage units, and each storage unit stores a polishing head. It is worth mentioning that since the polishing heads have various specifications, the storage units in this embodiment also have various specifications, so as to store polishing heads of different specifications.

S202: A pick-and-place device is provided.

Specifically, in this embodiment, the pick-and-place device may be a polishing mobile support. The polishing mobile support includes a holding space for holding the polishing head. When the polishing head needs to be used, the polishing mobile support automatically moves to the storage device. The pick-and-place device picks the polishing head from the storage device by a manipulator, and holds the polishing head in the holding space, and then automatically moves to a position where the polishing head needs to be used (such as at a CMP machine).

S203: A data acquisition device is provided. The data acquisition device records a first time when the polishing head is picked from the storage device and records a second time when the polishing head is placed back into the storage device.

Specifically, when the CMP machine needs a polishing head, the CMP machine sends a request for a polishing head to the data acquisition device, where the request includes the specification of the required polishing head. After receiving the request, the data acquisition device searches for the storage position of the polishing head in the storage device according to the specification of the required polishing head, and sends a pick instruction to the pick-and-place device, where the pick instruction includes the storage position. After receiving the instruction, the pick-and-place device moves to the storage position, and picks the polishing head, when the first time is recorded. After the polishing head completes the operation on the CMP machine, the pick- and place-device places the polishing head back into the storage device, when the second time is recorded.

Compared with the prior art, the embodiments of the present disclosure provide a storage device to store the polishing heads, and accurately acquire the number of available polishing heads according to the storage condition in the storage device, so as to facilitate management. The embodiments of the present disclosure provide a pick-and-place device, which can automatically pick the polishing head from the storage device when the CMP machine needs the polishing head, and automatically place the polishing head back into the storage device after the CMP machine finishes operation. This avoids manually picking or placing the polishing head, saving the labor cost. The embodiments of the present disclosure provide a data acquisition device, which can automatically record the first time when the polishing head is picked and record the second time when it is placed back into the storage device. The embodiments of the present disclosure can acquire the current use time of the polishing head according to the first time and the second time, and can acquire the total use time of the polishing head according to historical records (i.e. the first time in history and the second time in history). In this way, the embodiments of the present disclosure avoid the occurrence of manually recording the use time of the polishing head through a paper sheet, thereby further reducing the labor cost and realizing environmentally friendly paperless operations.

Figure 4:
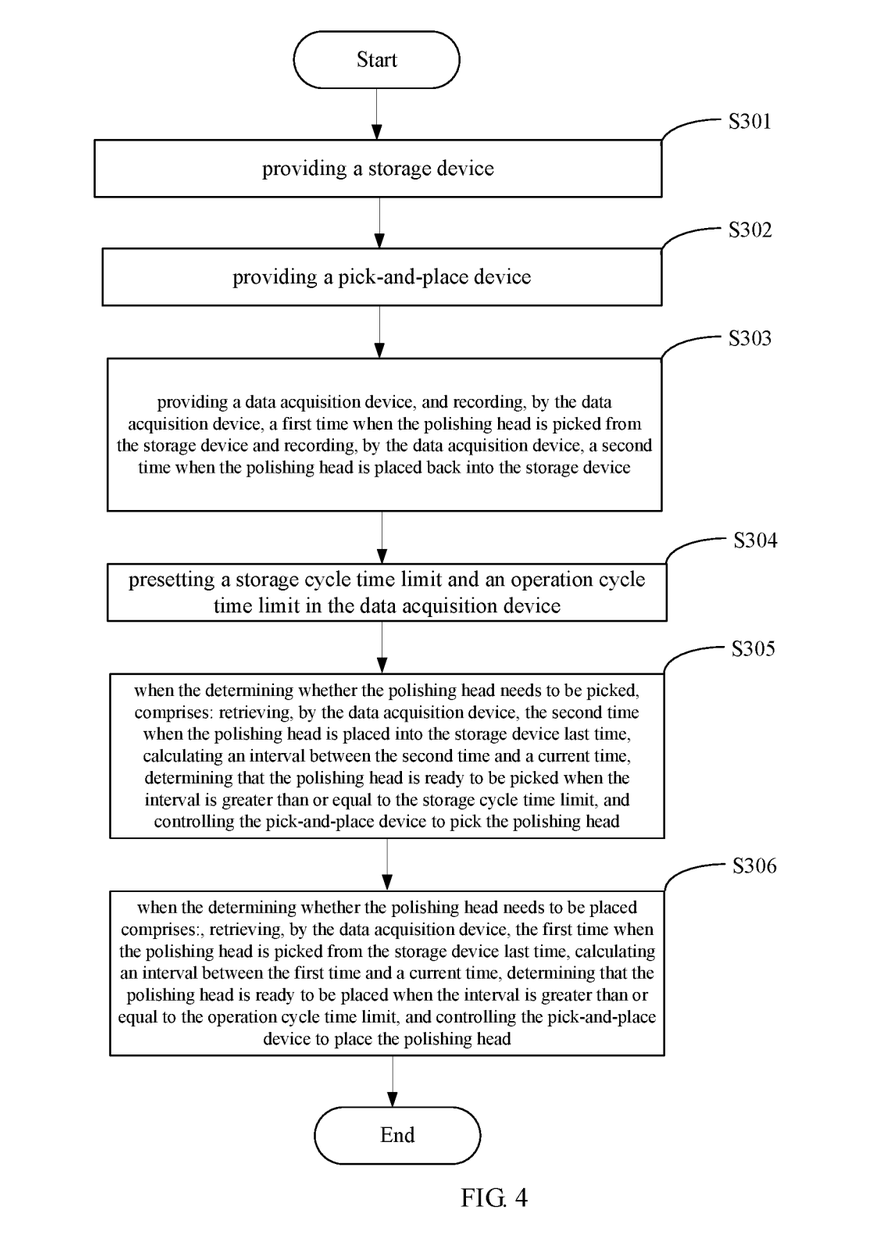
FIG. 4 is a flowchart of a polishing head management method according to an embodiment of the present disclosure.

Another embodiment of the present disclosure relates to a polishing head management method. This embodiment is further improved based on the above embodiment. The specific improvement lies in that, in this embodiment, before picking or placing, by the pick-and-place device, a polishing head, the management method further includes: determine whether the polishing head needs to be picked or placed. In this way, the polishing head management method is more automated and intelligent, thereby reducing the labor cost.

S301: A storage device is provided.

S302: A pick-and-place device is provided.

S303: A data acquisition device is provided. The data acquisition device records a first time when the polishing head is picked from the storage device and records a second time when the polishing head is placed back into the storage device.

S304: A storage cycle time limit and an operation cycle time limit are preset in the data acquisition device.

Specifically, the storage cycle time limit is a time interval threshold for the polishing head to be picked after being placed into a storage unit, and the operation cycle time limit is a time interval threshold for the polishing head to be placed back into the storage unit after being picked from the storage unit for operation. This embodiment does not specifically limit the storage cycle time limit and the operation cycle time limit, and an appropriate storage cycle time limit and operation cycle time limit may be set according to different requirements.

S305: When it is determined whether the polishing head needs to be placed, the data acquisition device retrieves the second time when the polishing head is placed into the storage unit last time, and calculates an interval between the second time and a current time, determines that the polishing head is ready to be picked when the interval is greater than or equal to the storage cycle time limit, and controls the pick-and-place device to pick the polishing head.

Specifically, in this embodiment, the polishing head is directly sent to the storage unit after being taken off a machine. According to the labor arrangement, the unmaintained polishing head taken off the machine will be taken out for maintenance, and then sent back to the storage device. It is understandable that the unmaintained polishing head placed in the storage device will be taken out from the storage device for maintenance within a preset time. Therefore, when the interval between the second time and the current time is greater than or equal to the storage cycle time limit, it indicates that the polishing head has been maintained, and the polishing head is ready to be picked for another use.

S306: When it is determined whether the polishing head needs to be placed, the data acquisition device retrieves the first time when the polishing head is picked from the storage unit last time, and calculates an interval between the first time and a current time, determines that the polishing head is ready to be placed when the interval is greater than or equal to the operation cycle time limit, and controls the pick-and-place device to place the polishing head.

Specifically, the normal on-machine operation time of the polishing head is generally an operation cycle time limit. When the operation time of the polishing head is less than the operation cycle time limit, it indicates that the polishing head operates abnormally and needs to be maintained or repaired in time. Therefore, when the interval is greater than or equal to the operation cycle time limit, it indicates that the polishing head operates normally, it is determined that the polishing head is ready to be placed, and the pick-and-place device is controlled to place the polishing head.

It is worth mentioning that when the pick-and-place device places the polishing head into the storage unit, the data acquisition device further records pairing information between the storage unit and the polishing head. There are a plurality of polishing heads stored in the storage device, so there are a plurality of pick-and-place devices. In this way, the present disclosure can accurately obtain the identity of the placed polishing head (that is, which polishing head is placed), so as to more accurately record the use time of each polishing head.

Steps S301 to S303 of this embodiment are similar to Steps S201 to S203 of the above embodiment, and will not be repeated here to avoid repetition.

Compared with the prior art, the embodiments of the present disclosure provide a storage device to store the polishing heads, and accurately acquire the number of available polishing heads according to the storage condition in the storage device, so as to facilitate management. The embodiments of the present disclosure provide a pick-and-place device, which can automatically pick the polishing head from the storage device when the CMP machine needs the polishing head, and automatically place the polishing head back into the storage device after the CMP machine finishes operation. This avoids manually picking or placing the polishing head, saving the labor cost. The embodiments of the present disclosure provide a data acquisition device, which can automatically record the first time when the polishing head is picked and record the second time when it is placed back into the storage device. The embodiments of the present disclosure can acquire the current use time of the polishing head according to the first time and the second time, and can acquire the total use time of the polishing head according to historical records (i.e. the first time in history and the second time in history). In this way, the embodiments of the present disclosure avoid the occurrence of manually recording the use time of the polishing head through a paper sheet, thereby further reducing the labor cost and realizing environmentally friendly paperless operations.

Figure 5:
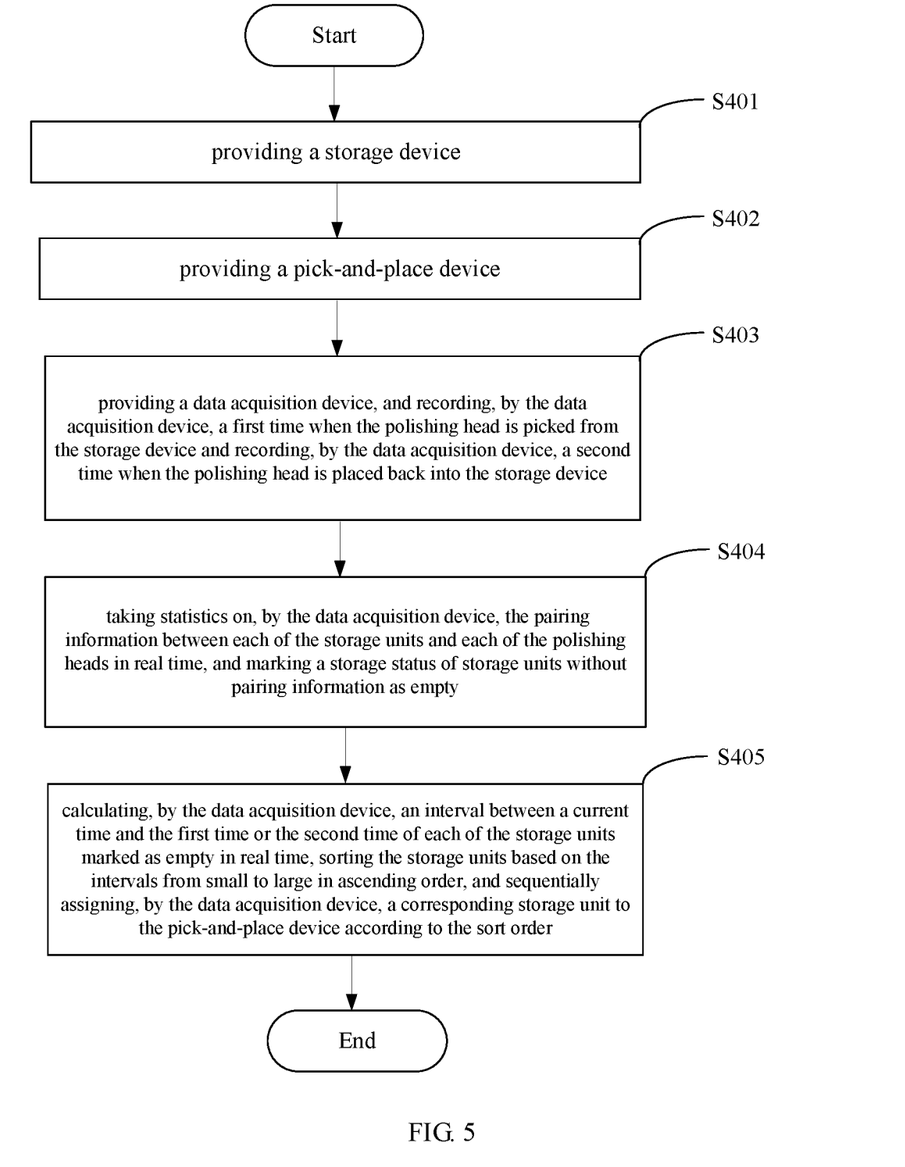
FIG. 5 is a flowchart of a polishing head management method according to an embodiment of the present disclosure.

Another embodiment of the present disclosure relates to a polishing head management method. This embodiment is further improved based on the above embodiment. The specific improvement lies in that, in this embodiment, it is further defined how to assign a corresponding storage unit to the pick-and-place device when the pick-and-place device needs to place the polishing head into the storage device.

S401: A storage device is provided.

S402: A pick-and-place device is provided.

S403: A data acquisition device is provided. The data acquisition device records a first time when the polishing head is picked from the storage device and records a second time when the polishing head is placed back into the storage device.

S404: The data acquisition device takes statistics on the pairing information between each of storage units and each of polishing heads in real time, and marks a storage status of storage units without pairing information as empty.

S405: The data acquisition device calculates an interval between a current time and the first time or the second time of each of the storage units marked as empty in real time, and sorts the storage units based on the intervals from small to large in ascending order. Finally, the data acquisition device sequentially assigns a corresponding storage unit to the pick-and-place device according to the sort order.

Specifically, it is assumed that there are five storage units A to E whose storage status is marked as empty. The times (i.e. the first times) when the polishing heads in the five storage units 10 are picked, which are 12:00, 13:00, 14:00, 15:00 and 16:00, respectively. The current time is 17:00, so the intervals between the current time and the first times of the storage units A to E are respectively 5 h, 4 h, 3 h, 2 h and 1 h. The storage unit A with the largest interval is assigned to the pick-and-place device. The pick-and-place device places a polishing head just off the machine into the storage unit A.

Steps S401 to S403 of this embodiment are similar to Steps S201 to S203 of the above embodiment, and will not be repeated here to avoid repetition.

Specifically, the alarm message in this embodiment may be a bell, a red light, etc., and the type of the alarm message is not specifically limited.

Compared with the prior art, the embodiments of the present disclosure provide a storage device to store the polishing heads, and accurately acquire the number of available polishing heads according to the storage condition in the storage device, so as to facilitate management. The embodiments of the present disclosure provide a pick-and-place device, which can automatically pick the polishing head from the storage device when the CMP machine needs the polishing head, and automatically place the polishing head back into the storage device after the CMP machine finishes operation. This avoids manually picking or placing the polishing head, saving the labor cost. The embodiments of the present disclosure provide a data acquisition device, which can automatically record the first time when the polishing head is picked and record the second time when it is placed back into the storage device. The embodiments of the present disclosure can acquire the current use time of the polishing head according to the first time and the second time, and can acquire the total use time of the polishing head according to historical records (i.e. the first time in history and the second time in history). In this way, the embodiments of the present disclosure avoid the occurrence of manually recording the use time of the polishing head through a paper sheet, thereby further reducing the labor cost and realizing environmentally friendly paperless operations.

Figure 6:
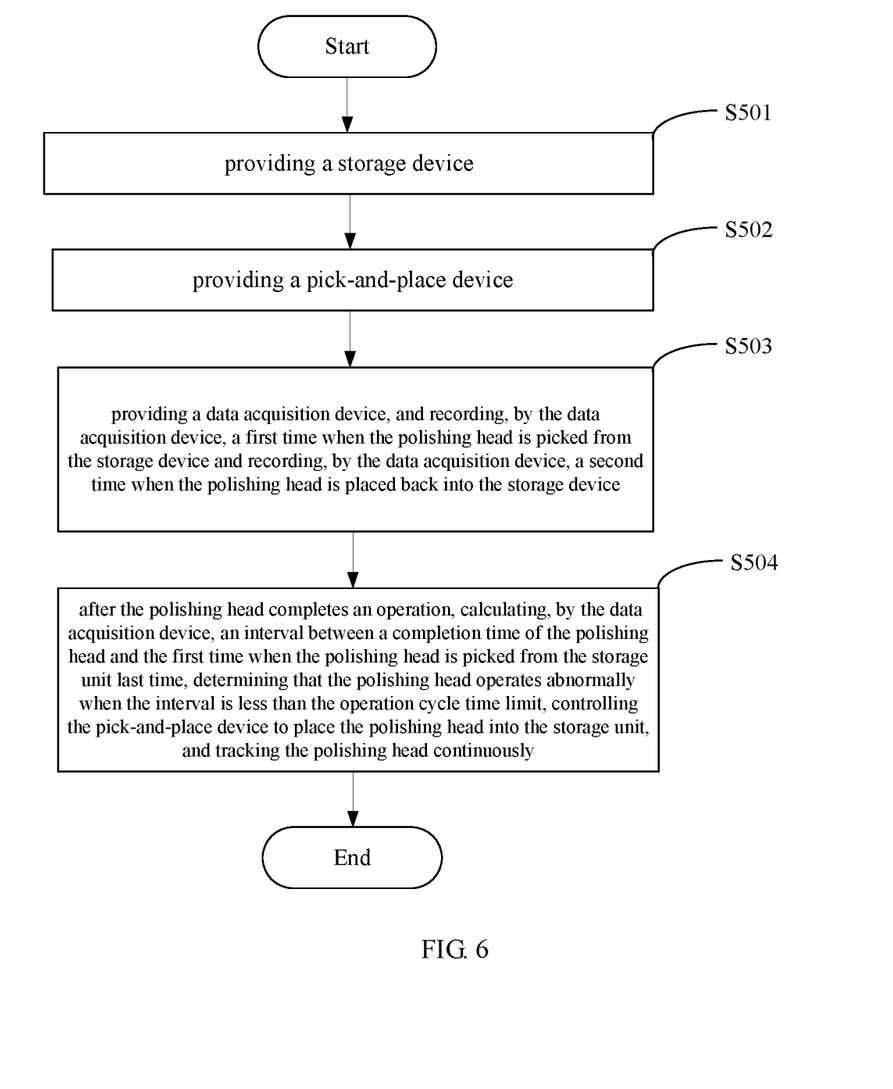
FIG. 6 is a flowchart of a polishing head management method according to an embodiment of the present disclosure.

Another embodiment of the present disclosure relates to a polishing head management method. This embodiment is further improved based on the above embodiment. The specific improvement lies in that, in this embodiment, the management method further includes abnormal operation processing. After the polishing head completes an operation, the data acquisition device calculates an interval between a completion time of the polishing head and the first time when the polishing head is picked from the storage unit last time, determines that the polishing head operates abnormally when the interval is less than the operation cycle time limit, controls the pick-and-place device to place the polishing head into the storage unit, and tracks the polishing head continuously.

The specific process of this embodiment is shown in FIG. 6, the polishing head management method includes:

S501: A storage device is provided.

S502: A pick-and-place device is provided.

S503: A data acquisition device is provided. The data acquisition device records a first time when the polishing head is picked from the storage device and records a second time when the polishing head is placed back into the storage device.

S504: After the polishing head completes an operation, the data acquisition device calculates an interval between a completion time of the polishing head and the first time when the polishing head is picked from the storage unit last time, determines that the polishing head operates abnormally when the interval is less than the operation cycle time limit, controls the pick-and-place device to place the polishing head into the storage unit, and tracks the polishing head continuously.

Specifically, the normal operation time of the polishing head is generally an operation cycle time limit. When the operation time of the polishing head is less than the operation cycle time limit, it indicates that the polishing head operates abnormally. Therefore, the pick-and-place device is controlled to place the polishing head into the storage unit and the polishing head is subjected to continuous tracking. This method makes it possible to find the problem of the polishing head in the first time, so as to maintain or repair the polishing head in time, thereby further improving the reliability of the polishing head management method.

It is worth mentioning that this embodiment further records the number of abnormal operations of the polishing head. When the number of abnormal operations of the polishing head exceeds a preset number, the pick-and-place device may not be controlled to place the polishing head into the storage unit. Instead, the failure of the polishing head is directly analyzed, and the polishing head is repaired, maintained or even replaced in a timely manner. It is understandable that this embodiment does not specifically limit the preset number. The preset number is preferably three, and may be set according to actual needs.

Compared with the prior art, the embodiments of the present disclosure provide a storage device to store the polishing heads, and accurately acquire the number of available polishing heads according to the storage condition in the storage device, so as to facilitate management. The embodiments of the present disclosure provide a pick-and-place device, which can automatically pick the polishing head from the storage device when the CMP machine needs the polishing head, and automatically place the polishing head back into the storage device after the CMP machine finishes operation. This avoids manually picking or placing the polishing head, saving the labor cost. The embodiments of the present disclosure provide a data acquisition device, which can automatically record the first time when the polishing head is picked and record the second time when it is placed back into the storage device. The embodiments of the present disclosure can acquire the current use time of the polishing head according to the first time and the second time, and can acquire the total use time of the polishing head according to historical records (i.e. the first time in history and the second time in history). In this way, the embodiments of the present disclosure avoid the occurrence of manually recording the use time of the polishing head through a paper sheet, thereby further reducing the labor cost and realizing environmentally friendly paperless operations.

Those of ordinary skill in the art should understand that the above embodiments are specific embodiments for implementing the present disclosure. In practical applications, various changes may be made to the above embodiments in terms of form and details without departing from the spirit and scope of the present disclosure. Any person skilled in the art may make changes and modifications to the embodiments without departing from the spirit and scope of the present disclosure. Therefore, the protection scope of the present disclosure should be subject to the scope defined by the claims.

What is claimed is:

1. A polishing head management system, comprising a storage device, a pick-and-place device and a data acquisition device, wherein the storage device is used to store polishing heads;

the pick-and-place device is used to pick a polishing head or place a polishing head into the storage device;

the data acquisition device is connected with the storage device and the pick-and-place device, and the data acquisition device is used to record at least one management cycle of the polishing head; the management cycle comprises a time interval between the time of the polishing head being picked from the storage device by the pick-and-place device and the time of the polishing head being placed back into the storage device or a time interval between the time of the polishing head being placed into the storage device by the pick-and-place device and the time of the polishing head being picked from the storage device; and, wherein the storage device comprises a plurality of storage units; each of the storage units stores each of the polishing heads; the data acquisition device further comprises an identification module; the identification module is used to identify pairing information between each of the storage units and each of the polishing heads;

wherein the identification module comprises a first identification module and a second identification module connected with each other communicatively; the first identification module is used to identify pairing information between the storage unit and the pick-and-place device; the second identification module is used to identify pairing information between the pick-and-place device and the polishing head.

2. The polishing head management system according to claim 1, wherein the storage device further comprises a display module; the display module is communicatively connected with the data acquisition device, and the display module is used to display a storage status of each storage unit.

3. The polishing head management system according to claim 1, wherein the data acquisition device further comprises a control module; the control module is communicatively connected with the identification module and the pick-and-place device; the control module presets a cycle time limit threshold; the control module determines the storage status of the storage unit according to the pairing information, the cycle time limit threshold and the management cycle, and assigns a corresponding storage unit to the pick-and-place device according to the storage status.

4. A polishing head management method, comprising:

providing a storage device, wherein the storage device stores polishing heads;

providing a pick-and-place device, and picking, by the pick-and-place device, a polishing head from the storage device, or placing, by the pick-and-place device, a polishing head into the storage device; and providing a data acquisition device, and recording, by the data acquisition device, a first time when the polishing head is picked from the storage device and recording, by the data acquisition device, a second time when the polishing head is placed back into the storage device; and, wherein before the picking or placing, by the pick-and-place device, a polishing head, the management method further comprises: determining whether the polishing head needs to be picked or placed;

determining whether the polishing head needs to be picked or placed comprises:

presetting a storage cycle time limit and an operation cycle time limit in the data acquisition device, wherein the storage cycle time limit is a time interval threshold for the polishing head to be picked after being placed into the storage device, and the operation cycle time limit is a time interval threshold for the polishing head to be placed back into the storage device after being picked from the storage device for operation;

the management method further comprises:

when determining the polishing head needs to be picked, retrieving, by the data acquisition device, the second time when the polishing head is placed into the storage device last time, calculating an interval between the second time and a current time, determining that the polishing head is ready to be picked when the interval is greater than or equal to the storage cycle time limit, and controlling the pick-and-place device to pick the polishing head; and when determining the polishing head needs to be placed, retrieving, by the data acquisition device, the first time when the polishing head is picked from the storage device last time, calculating an interval between the first time and a current time, determining that the polishing head is ready to be placed when the interval is greater than or equal to the operation cycle time limit, and controlling the pick-and-place device to place the polishing head.

5. The polishing head management method according to claim 4, wherein the storage device comprises a plurality of storage units; each of the storage units stores each of the polishing heads; when the pick-and-place device places the polishing head into the storage unit, the data acquisition device records pairing information between the storage unit and the polishing head.

6. The polishing head management method according to claim 5, wherein after the determining whether the polishing head needs to be picked or placed, before the picking or placing, by the pick-and-place device, a polishing head, the management method further comprises: taking statistics on, by the data acquisition device, the pairing information between each of the storage units and each of the polishing heads in real time, and marking a storage status of storage units without pairing information as empty;

calculating, by the data acquisition device, an interval between a current time and the first time or the second time of each of the storage units marked as empty in real time, sorting the storage units based on the intervals from small to large in ascending order, and sequentially assigning, by the data acquisition device, a corresponding storage unit to the pick-and-place device according to the sort order.

7. The polishing head management method according to claim 6, wherein the management method further comprises abnormal operation processing, the abnormal operation processing comprises: after the polishing head completes an operation, calculating, by the data acquisition device, an interval between a completion time of the polishing head and the first time when the polishing head is picked from the storage unit last time, determining that the polishing head operates abnormally when the interval is less than the operation cycle time limit, controlling the pick-and-place device to place the polishing head into the storage unit, and tracking the polishing head continuously.

8. A polishing head management system, comprising
a storage device, a pick-and-place device and a data acquisition device, wherein
the storage device is used to store polishing heads;
the pick-and-place device is used to pick a polishing head or place a polishing head into the storage device;
the data acquisition device is connected with the storage device and the pick-and-place device, and the data acquisition device is used to record at least one management cycle of the polishing head; the management cycle comprises a time interval between the time of the polishing head being picked from the storage device by the pick-and-place device and the time of the polishing head being placed back into the storage device or a time interval between the time of the polishing head being placed into the storage device by the pick-and-place device and the time of the polishing head being picked from the storage device;
wherein the storage device comprises a plurality of storage units; each of the storage units stores each of the polishing heads; the data acquisition device further comprises an identification module; the identification module is used to identify pairing information between each of the storage units and each of the polishing heads;
wherein the data acquisition device further comprises a control module; the control module is communicatively connected with the identification module and the pick-and-place device; the control module presets a cycle time limit threshold; the control module determines the storage status of the storage unit according to the pairing information, the cycle time limit threshold and the management cycle, and assigns a corresponding storage unit to the pick-and-place device according to the storage status.

\* \* \* \* \*